United States Patent
Anahara et al.

(10) Patent No.: US 6,607,690 B2
(45) Date of Patent: Aug. 19, 2003

(54) METHODS FOR MANUFACTURING CERAMIC GREEN SHEET AND MULTILAYER CERAMIC ELECTRONIC PARTS

(75) Inventors: Toshiya Anahara, Moriyama (JP); Ichiro Nakamura, Kusatsu (JP)

(73) Assignee: Murata Manufacturing Co. Ltd (JP)

( * ) Notice: Subject to any disclaimer, the term of this patent is extended or adjusted under 35 U.S.C. 154(b) by 0 days.

(21) Appl. No.: 09/971,756

(22) Filed: Oct. 5, 2001

(65) Prior Publication Data

US 2002/0125618 A1 Sep. 12, 2002

(30) Foreign Application Priority Data

Oct. 6, 2000 (JP) .................................... 2000-307883

(51) Int. Cl.[7] .................................................. B28B 1/16
(52) U.S. Cl. ...................... 264/614; 264/213; 264/615; 264/650
(58) Field of Search ................................ 264/615, 614, 264/619, 650, 213

(56) References Cited

U.S. PATENT DOCUMENTS 5,808,856 A * 9/1998 Bischoff et al. ......... 361/321.4

FOREIGN PATENT DOCUMENTS

JP 10-229027 8/1998

OTHER PUBLICATIONS

Polycrom, Inc. Mylar information sheet, www.polycrom.com/PET.*

Mylar, product information sheet (12/97).*

* cited by examiner

*Primary Examiner*—Christopher A. Fiorilla
(74) *Attorney, Agent, or Firm*—Dickstein, Shapiro, Morin & Oshinsky, LLP

(57) ABSTRACT

A ceramic green sheet is manufactured by preparing a support which includes a releasing layer formed on its top surface and has a smoothness that at least a region of the top surface of the support to be coated with a ceramic slurry has substantially no projections having a height of equal to or more than about 1 $\mu$m, and applying a ceramic slurry to the releasing layer of the support, which ceramic slurry contains a ceramic powder dispersed in a medium. This ceramic green sheet has a small thickness of, for example, about 0.3 to 3 $\mu$m, has no depressions or through holes caused by a filler in the support and is excellent in smoothness.

20 Claims, 1 Drawing Sheet

METHODS FOR MANUFACTURING CERAMIC GREEN SHEET AND MULTILAYER CERAMIC ELECTRONIC PARTS

BACKGROUND OF THE INVENTION

1. Field of the Invention

The present invention relates to a method for manufacturing a ceramic green sheet. Specifically, the present invention relates to a method for manufacturing a ceramic green sheet for use in manufacture of multilayer ceramic electronic parts such as ceramic capacitors or multilayer ceramic substrates and to a method for manufacturing multilayer ceramic electronic parts by using the ceramic green sheet manufactured by the method.

2. Description of the Related Art

Multilayer ceramic capacitors, multilayer ceramic substrates and other multilayer ceramic electronic parts are generally manufactured by a method in which ceramic green sheets are laminated, compressed and heat-treated to thereby sinter the ceramic and electrodes.

A multilayer ceramic capacitor having a structure shown in FIG. 1 is taken herein as an example. This multilayer ceramic capacitor comprises a ceramic device 1, inner electrodes 2 and a pair of outer electrodes 3a and 3b. The inner electrodes 2 are arranged inside the ceramic device 1 and are alternately derived from the right and left sides of the ceramic device 1 as illustrated in the figure, and the outer electrodes 3a and 3b are arranged at both sides of the ceramic device 1 so as to electrically communicate with the inner electrodes 2. The multilayer ceramic capacitor of this type is generally manufactured by the following method:

(1) With reference to FIG. 2, an inner electrode 2 for constituting an electric capacity is initially formed on a ceramic green sheet to thereby yield an electrode-carrying sheet 11.

(2) Next, predetermined plies of the electrode-carrying sheet 11 are laminated to yield a laminate, and ceramic green sheets (outermost-layer sheets) 21 carrying no electrode are laminated and compressed on upper and lower sides of the laminate to thereby form a laminate (unfired laminate) 1a. In the resulting laminate, the inner electrodes 2 are alternately derived from the right and left sides of the ceramic device 1 (FIG. 2).

(3) The laminate 1a is then fired under predetermined conditions to thereby sinter the ceramic, a conductive paste is applied to and baked on the right and left sides of the fired laminate (ceramic device) 1 to thereby constitute outer electrodes 3a and 3b which electrically communicate with the inner electrodes 2. Thus, a multilayer ceramic capacitor as shown in FIG. 1 is obtained.

Likewise, other multilayer ceramic electronic parts such as multilayer ceramic substrates are manufactured through a process in which ceramic green sheets are laminated to form a laminate as in the multilayer ceramic capacitor mentioned above.

Ceramic green sheets for use in the manufacture of multilayer ceramic electronic parts are generally manufactured by the following process: A ceramic powder is mixed with predetermined proportions of a dispersion medium (solvent), dispersing agent, binder, plasticizer and other additives, the resulting mixture is mixed and dispersed using medium-type dispersing apparatus such as a bead mill, ball mill, attriter, paint shaker or sand mill to yield a ceramic slurry, and the ceramic slurry is applied to a support (e.g., a carrier film) by, for example, a doctor blade process to yield a sheet having a predetermined thickness and is dried.

As the support, a poly(ethylene terephthalate) film containing an inorganic or organic powder having a particle size of several micrometers as a filler is generally used.

Demands have also been made on miniaturized and high-performance multilayer ceramic electronic parts such as multilayer ceramic capacitors as in the other electronic devices. To this end, ceramic green sheets for use in the manufacturing process of multilayer ceramic electronic parts must be very thin and must have a thickness of, for example, less than or equal to about 3 μm.

However, the support (e.g., a carrier film) containing a filler having a particle size of several micrometers has prominent projections due to the filler, and the resulting ceramic green sheet has, for example, depressions about 0.3 to 2 μm deep or through holes in the thickness of some parts of the sheets. The term "depressions" as used herein means depressions or blind holes that do not penetrate the sheet.

If such ceramic green sheets having depressions, through holes and other defects are used in the manufacture of multilayer ceramic electronic parts such as multilayer ceramic capacitors and multilayer ceramic substrates, they cause failures such as short-circuits and decreased withstand voltages.

In the manufacturing process of electronic parts, the resulting ceramic green sheet must be peeled from the support, and the support generally has a releasing layer including a silicone-based material on its top surface. If the top surface of the support is smoothened and the support has a releasing layer composed of a silicone-based material on its top surface (e.g., when the support is a carrier film and is wound up), slidability between two plies of the carrier film is deteriorated, and the two plies of the carrier film are adhered with each other, seriously compromising the manufacturing process of the carrier film itself or the manufacturing process of a ceramic green sheet using the carrier film.

As a possible solution to these problems, Japanese Unexamined Patent Application Publication No. 10-229027 proposes a method in which the carrier film used has a roughened undersurface (an opposite or backside surface to the top surface) and having improved slidability. However, when a ceramic green sheet is manufactured by this method, projections caused by the filler on the roughed undersurface are pressed to a top surface of the wound ceramic green sheet to thereby cause tears, through holes, projections and other defects of the ceramic green sheet.

If ceramic green sheets having these defects are used for the manufacture of ceramic electronic parts such as multilayer ceramic capacitors and multilayer ceramic substrates, they cause failures such as short circuits and decreased withstand voltages.

SUMMARY OF THE INVENTION

Accordingly, it is an object of the present invention to provide a method for manufacturing a multilayer ceramic green sheet that has a small thickness, includes no defects such as tears, through holes and projections, and has a high reliability and to provide a method for manufacturing multilayer ceramic electronic parts using a ceramic green sheet manufactured by the aforementioned method.

Specifically, the present invention provides, in an aspect, a method for manufacturing a ceramic green sheet for multilayer ceramic electronic parts by applying a ceramic slurry to a support, which method includes the steps of preparing the support, which support carrying a releasing layer on its top surface and has such smoothness that at least a region of the top surface of the support to be coated with the ceramic slurry has substantially no projections having a height of equal to or more than about 1 $\mu$m, and applying a ceramic slurry to the releasing layer of the support, which ceramic slurry contains a ceramic powder dispersed in a medium.

By this configuration, a ceramic green sheet having a small thickness (e.g., a thickness of from about 0.3 to 3 $\mu$m), having no defects such as tears or through holes and having high reliability can be efficiently and reliably manufactured.

The phrase "at least a region to be coated with the ceramic slurry has substantially no projections having a height of equal to or more than about 1 $\mu$m" as used herein is not intended exclude cases where the region includes non-stationary or very local projections caused by contamination or variation in manufacturing conditions but means cases where a principle part of the support itself has no projections having a height of equal to or more than about 1 $\mu$m.

The term "support" as used herein means and includes carrier films that can be wound up (e.g., films of poly (ethylene terephthalate) (PET) and poly(ethylene-2,6-naphthalene dicarboxylate) (PEN)), as well as sheets, films, metallic belts, rigid plates and other articles that can be cut to a predetermined size and can be laminated, and there is no specific limitation in concrete properties, materials, dimensions and other characteristics of these articles.

The term "ceramic slurry including a ceramic powder dispersed in a medium" means not only a composition containing a ceramic powder dispersed in a medium (a dispersion medium or solvent) but also a composition further including a dispersing agent, binder, plasticizer, antistatic agent and other various additives in addition to the ceramic powder and medium. The ceramic slurry may comprise various substances in optional proportions according to necessity.

In the aforementioned manufacturing method, the support preferably has such smoothness that at least a region of an undersurface of the support has substantially no projections each having a height of equal to or more than about 1 $\mu$m, in which no ceramic slurry is applied to the undersurface (hereinafter simply referred to as "undersurface") and the region of the undersurface corresponds to the region of the top surface to be coated with the ceramic slurry.

This configuration can prevent damage of the ceramic green sheet in contact with the undersurface when the ceramic green sheet and the support are wound up and can further reliably provide a ceramic green sheet having substantially no defects.

Preferably, the resulting ceramic green sheet obtained by the manufacturing method has a thickness of from about 0.3 to 3 $\mu$m.

If the resulting ceramic green sheet is thin, conventional manufacturing methods may cause defects of the thin ceramic green sheet such as tears or through holes during manufacturing process, but the invented method can reliably manufacture a very thin ceramic green sheet having a thickness of from about 0.3 to 3 $\mu$m and being substantially free from such defects.

The top surface of the support to be coated with the ceramic slurry preferably has a coefficient of static friction and a coefficient of kinetic friction each of less than or equal to about 0.45.

This configuration can efficiently wind up and transport the support to further effectively exhibit advantages of the present invention. Specifically, if the top surface of the support to be coated with the ceramic slurry has a coefficient of static friction or a coefficient of kinetic friction exceeding about 0.45, the resulting support cannot be significantly wound up after the formation of a releasing layer, and other problems may occur in the manufacturing process of the support. However, the use of a support having a coefficient of static friction and a coefficient of kinetic friction each less than or equal to about 0.45 can prevent these problems.

The surface free energy of the top surface of the substrate to be coated with the ceramic slurry is not specifically limited and is preferably less than or equal to about 55 mJ/m$^2$.

This configuration can smooth the way to peel off the resulting ceramic sheet from the top surface of the support to thereby further effectively exhibit advantages of the present invention. If the surface free energy exceeds about 55 mJ/m$^2$, the ceramic green sheet may become resistant to being peeled off the support, and it may take more time to peel off the ceramic green sheet without damage and thereby deteriorate production efficiency.

The coefficients of friction as indicated in the present invention are measured by the method pursuant to Japanese Industrial Standards (JIS) K-7125.

The releasing layer for use in the present invention acts to control adhesion between the ceramic green sheet and the support. The formation of the releasing layer can reduce the force (peel force) to peel off the ceramic green sheet from the support to thereby smoothly peel off the ceramic green sheet. Additionally, the releasing layer acts to prevent adhesion of two plies of a support having a highly smooth surface and to decrease coefficients of friction of the support.

The support may further have an additional intermediate layer between the releasing layer and the support base. In this case, however, the additional intermediate layer must not cause the formation of productions having a height of equal to or more than about 1 $\mu$m on the top surface of the support.

In another aspect, the present invention provides a method for manufacturing multilayer ceramic electronic parts, which method includes the steps of laminating, cutting and firing plural plies of a combination of a ceramic green sheet with a base metal inner electrode to yield a sintered compact, which ceramic green sheet is manufactured by the aforementioned method, and forming an outer electrode on the sintered compact.

By this configuration, multilayer electronic parts having low short-circuit rates and other desired characteristics, high quality and high reliability and including no inner defects can be obtained.

DESCRIPTION OF THE PREFERRED EMBODIMENTS

Figure 1:
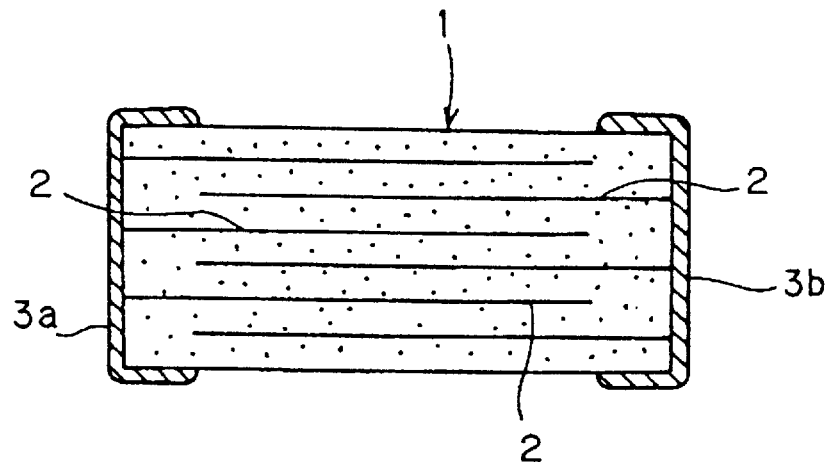
FIG. 1 is a sectional view showing a structure of a multilayer ceramic capacitor manufactured by laminating ceramic green sheets.

The present invention will be illustrated in further detail with reference to preferred embodiments.

Materials for the releasing layer are not specifically limited and include silicone materials and non-silicone materials, but it is preferable that the releasing layer includes fluorine for small static friction and kinetic friction. Such non-silicone materials include, for example, fluorine materials and organic-inorganic composite materials comprising a polysiloxane and a fluorine polymer. The silicone materials include, but are not limited to, curable silicone resins (e.g., those cured by heat or radiation) such as KS-847(H) and KS-776 (trade names, available from Shin-Etsu Silicones) and YSR-3022, TPR-6700, TPR-6720 and TPR-6721 (trade names, available from Toshiba Silicone Corporation). Materials other than these silicone materials are defined as the non-silicone materials herein.

Ceramic green sheets for use in the present invention are prepared, for example, by applying a ceramic slurry containing a ceramic powder, dispersing agent, binder, plasticizer, antistatic agent and dispersion medium to a support. The type and composition of the ceramic powder constituting the ceramic slurry are not specifically limited, and such ceramic powders include, for example, powders of dielectric ceramics such as barium titanate, strontium titanate and lead titanate; powders of magnetic ceramics such as ferrite; powders of piezoelectric ceramics; powders of insulative ceramics such as alumina and silica; and powders of other ceramics.

The particle size of the ceramic powder used is not specifically limited, but a mean particle size as determined by electron microscopic observation is preferably from about 0.01 to 1 $\mu$m when the invented method is applied to a very thin ceramic green sheet having a thickness of, for example, from about 0.3 to 3 $\mu$m.

The ceramic powder may further comprise various additives. For example, when the ceramic powder mainly contains barium titanate, it may further comprise glasses, magnesium oxide, manganese oxide, barium oxide, rare earth metal oxides, calcium oxide and other components. Additionally, the ceramic powder may further comprise impurities which are derived from raw materials or are contaminated during the manufacturing process.

The medium (dispersion medium or solvent) constituting the ceramic slurry for use in the present invention is not specifically limited and includes, for example, toluene, xylene and other aromatic mediums; ethyl alcohol, isopropyl alcohol, butyl alcohol and other alcohol media, and other various media. Each of these media can be used alone or in combination. Additionally, other organic media or water can also be used as the medium.

The binder includes, but is not limited to, polyvinyl butyral resins, cellulosic resins, acrylic resins, vinyl acetate resins and poly(vinyl alcohol) resins. The type and amount of the binder should be preferably selected depending on the type of a target ceramic green sheet.

The ceramic slurry may further comprise a plasticizer. Such plasticizers include, but are not limited to, polyethylene glycol, phthalic esters and alkyd resins. The type and amount of the plasticizer should be preferably selected depending on the type of a target ceramic green sheet.

The ceramic slurry may further comprise a dispersing agent and/or an antistatic agent. Such dispersing agents and antistatic agents for use in the present invention may be any of those generally used in ceramic slurries.

Plural plies of the resulting ceramic green sheet manufactured by the invented manufacturing method with a base metal inner electrode are laminated, cut and fired to yield a sintered compact, and outer electrodes are formed on the sintered compact to thereby yield multilayer ceramic electronic parts. In this case, base metal materials for constituting the base metal inner electrode are not specifically limited and include, for example, nickel, copper and other base metal materials. The electrode formed from the base metal material may be a printed electrode formed by, for example, screen printing or a metal foil electrode formed by thin film formation process.

The present invention will be described in further detail with reference to several examples below, which are not intended to limit the scope of the invention.

EXAMPLE 1

A support (a carrier film) was prepared by forming an organic-inorganic composite material layer 100 nm thick as a releasing layer on a top surface of a base support, which organic-inorganic composite material layer was composed of a fluorine polymer and polysiloxane, and which base support was composed of a poly(ethylene terephthalate) film 50 $\mu$m thick having such smoothness that the maximum projection height in both surfaces of the film was 0.9 $\mu$m.

The support (carrier film) had a surface free energy of 27 mJ/m$^2$, a coefficient of static friction of 0.20 and a coefficient of kinetic friction of 0.25.

The maximum projection heights indicated in Example 1 and the following examples and comparative examples were measured using an optical interferometric surface profiling instrument (resolution in plane: 1 $\mu$m, resolution in height direction: 0.1 nm).

Next, a ceramic slurry was prepared by dispersing a commercially available dielectric ceramic powder having a particle size of 0.2 $\mu$m (available from Sakai Chemical Co., Ltd. under the trade name of "BTO 2"), a dispersing agent (available from Nippon Oils & Fats Corporation under the trade name of "MALIALIM"), a binder (polyvinyl butyral available from Sekisui Chemical Co., Ltd.), a plasticizer (di-2-ethylhexyl phthalate (DOP)) and an antistatic agent into a dispersion medium. The resulting ceramic slurry was applied to a top surface of the above-prepared carrier film to thereby yield a ceramic green sheet.

In the present example, the ceramic slurry was applied by the doctor blade process to thereby yield a ceramic green sheet 3 μm thick.

Using the above-prepared ceramic green sheet, a multi-layer ceramic capacitor having the structure shown in FIG. 1 was manufactured by the following method:

(1) Initially, a Ni paste was screen-printed on the above-prepared ceramic green sheet to thereby yield an electrode-carrying sheet 11 having a printed inner electrode for constituting an electrical capacity on its top surface.

Figure 2:
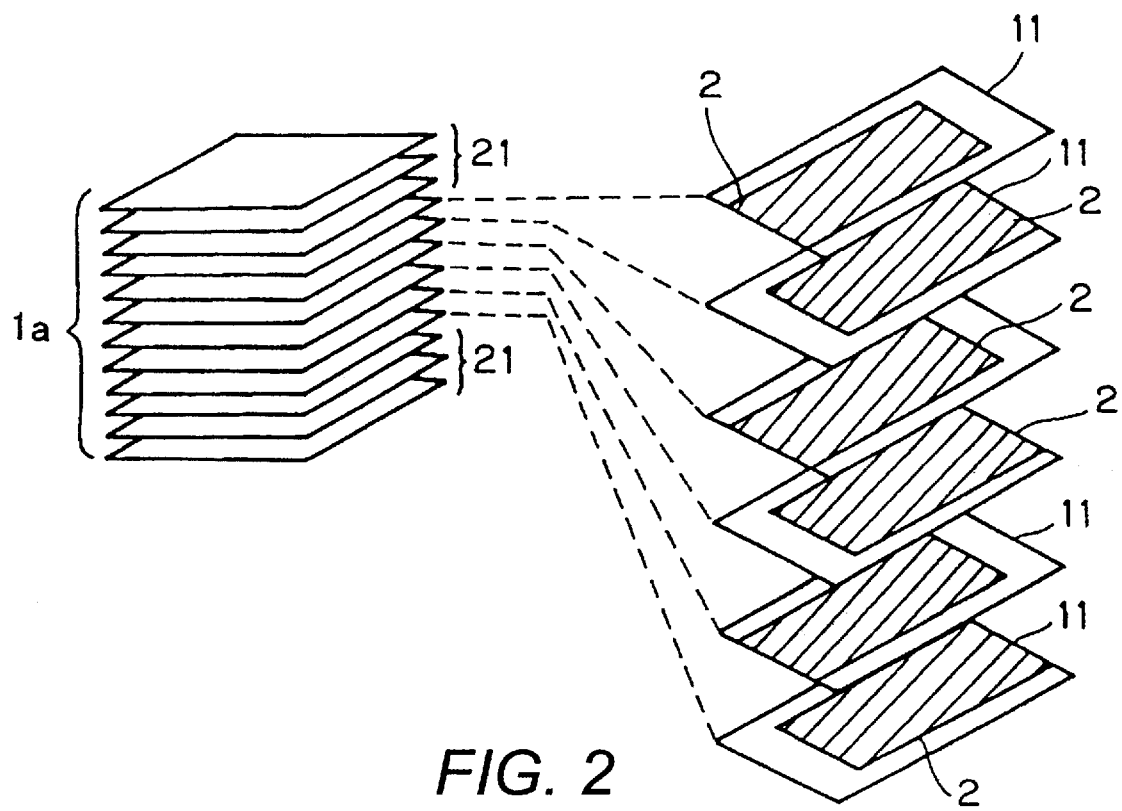
FIG. 2 is a diagram showing a manufacturing process of the multilayer ceramic capacitor of FIG. 1.

(2) Next, as shown in FIG. 2, predetermined plies (70 plies in this example) of electrode-carrying sheet 11 were laminated, and ceramic green sheets (outermost-layer sheets) 21 carrying no electrode were laminated and compressed on both upper and lower sides of the laminate to thereby form a laminate (unfired laminate) 1a, in which the inner electrodes 2 were alternately derived from the right and left sides of the laminate 1a.

(3) The laminate 1a was cut to a predetermined size using a dicer and was subjected to debinder and firing operations.

The debinder operation was performed by subjecting the laminate to a heat treatment in an atmosphere of nitrogen gas.

The firing operation was performed by heating the laminate at a predetermined temperature in a weakly reducing atmosphere.

(4) A conductive paste containing silver as a conductive component was then applied and baked on both side edges of the fired laminate (ceramic device) 1 to thereby constitute outer electrodes 3a and 3b which electrically communicated with the inner electrodes 2 (FIG. 1).

Thus, a multilayer ceramic capacitor containing Ni as the inner electrodes 2 as shown in FIG. 1 was obtained.

The short-circuit rate (short circuit occurrence) of the resulting multilayer ceramic capacitor was measured —it was satisfactory and was 0.7%. The temperature characteristic of electrostatic capacity satisfied X7R characteristic specified by EIA (the Electronic Industries Association) specifications.

EXAMPLE 2

A ceramic green sheet was prepared in the same manner as in Example 1, except that the thickness of the resulting ceramic green sheet was changed to 2 μm.

Using the above-prepared ceramic green sheet, a multi-layer ceramic capacitor was manufactured by the same method as in Example 1.

The short-circuit rate of the resulting multilayer ceramic capacitor was measured and found to the satisfactory at 1.1%. The temperature characteristic of electrostatic capacity satisfied the X7R characteristic.

EXAMPLE 3

A ceramic green sheet was prepared in the same manner as in Example 1, except that a poly(ethylene terephthalate) film having such smoothness that the maximum projection height in both surfaces was 0.3 μm was used and that the thickness of the resulting ceramic green sheet was changed to 0.3 μm.

Using the above-prepared ceramic green sheet, a multi-layer ceramic capacitor was manufactured by the same method as in Example 1.

The short-circuit rate of the resulting multilayer ceramic capacitor was measured. It was satisfactory and was 3.6%. The temperature characteristic of electrostatic capacity satisfied the X7R characteristic.

EXAMPLE 4

A ceramic green sheet was prepared in the same manner as in Example 1, except that a support (a carrier film) was prepared by forming a silicone-based material layer 100 nm thick as a releasing layer on the base support.

Using the above-prepared ceramic green sheet, a multi-layer ceramic capacitor was manufactured by the same method as in Example 1.

The short-circuit rate of the resulting multilayer ceramic capacitor was measured. It as satisfactory and was 0.8%. The temperature characteristic of electrostatic capacity satisfied the X7R characteristic.

COMPARATIVE EXAMPLE 1

A support (a carrier film) was prepared by forming an organic-inorganic composite material layer 100 μm thick as a releasing layer on a top surface of a base support. In this procedure, the organic-inorganic composite material layer included a fluorine polymer and polysiloxane, and the base support included a poly(ethylene terephthalate) film 50 μm thick having such smoothness that the maximum projection height in both surfaces was 2.2 μm.

The support (carrier film) had a surface free energy of 27 mJ/m$^2$, a coefficient of static friction of 0.16 and a coefficient of kinetic friction of 0.20.

A ceramic green sheet 3 μm thick was prepared in the same manner as in Example 1, except that the above-prepared support (carrier film) was used.

Using the above-prepared ceramic green sheet, a multi-layer ceramic capacitor was manufactured by the same method as in Example 1.

The short-circuit rate of the resulting multilayer ceramic capacitor was measured. It was high and was 51%. However, the temperature characteristic of electrostatic capacity satisfied the X7R characteristic.

COMPARATIVE EXAMPLE 2

A ceramic green sheet 2 μm thick was prepared using the same support as in Comparative Example 1 in the same manner as in Example 2.

Using the above-prepared ceramic green sheet, a multi-layer ceramic capacitor was manufactured by the same method as in Example 1.

The short-circuit rate of the resulting multilayer ceramic capacitor was measured to find that it was high at 76%. However, the temperature characteristic of electrostatic capacity satisfied the X7R characteristic.

COMPARATIVE EXAMPLE 3

A support (a carrier film) was prepared by forming an organic-inorganic composite material layer 100 μm thick as a releasing layer on a top surface of a base support. In this procedure, the organic-inorganic composite material layer was composed of a fluorine polymer and a polysiloxane, and the base support was composed of a poly(ethylene terephthalate) film 50 μm thick having such smoothness that the maximum projection height in both surfaces was 1.3 μm. The support (carrier film) had a surface free energy of 27 mJ/m$^2$, a coefficient of static friction of 0.18 and a coefficient of kinetic friction of 0.22.

A ceramic green sheet 3 mm thick was prepared in the same manner as in Example 1, except that the above-prepared support (carrier film) was used.

Using the above-prepared ceramic green sheet, a multi-layer ceramic capacitor was manufactured by the same method as in Example 1.

The short-circuit rate of the resulting multilayer ceramic capacitor was measured to find that it was high at 16%. However, the temperature characteristic of electrostatic capacity satisfied the X7R characteristic.

COMPARATIVE EXAMPLE 4

A ceramic green sheet 2 μm thick was prepared using the same support as in Comparative Example 3 in the same manner as in Example 2.

Using the above-prepared ceramic green sheet, a multi-layer ceramic capacitor was manufactured by the same method as in Example 1.

The short-circuit rate of the resulting multilayer ceramic capacitor was measured to find that it was high and was 28%. However, the temperature characteristic of electrostatic capacity satisfied the X7R characteristic.

COMPARATIVE EXAMPLE 5

A base support without any releasing layer on its top surface was used. This support was composed of a poly(ethylene terephthalate) film 50 μm thick, had such smoothness that the maximum projection height in both surfaces was 0.9 μm, and the top surface of the support to be coated with a ceramic slurry had a surface free energy of 55 mJ/m$^2$, a coefficient of static friction of 0.31 and a coefficient of kinetic friction of 0.37. A ceramic green sheet 3 mm thick was prepared in the same manner as in Example 1, except that the aforementioned support was used.

Using the above-prepared ceramic green sheet, a multi-layer ceramic capacitor was manufactured by the same method as in Example 1.

The short-circuit rate of the resulting multilayer ceramic capacitor was measured to find that it was satisfactory and was 1%. The temperature characteristic of electrostatic capacity satisfied the X7R characteristic.

However, in this Comparative Example 5, it took two to three times longer to peel off the ceramic green sheet from the support than that of Example 1, thus markedly deteriorating production efficiency.

COMPARATIVE EXAMPLE 6

A support (carrier film) was prepared by forming a silicone releasing layer on a top surface of a base support. In this procedure, the base support was composed of a poly(ethylene terephthalate) film 50 μm thick having such smoothness that the maximum projection height in both surfaces was 0.9 μm. The support (carrier film) had a surface free energy of 16 mJ/m$^2$, a coefficient of static friction of 0.64 and a coefficient of kinetic friction of 0.56. An attempt was made to provide a ceramic green sheet under the same condition as in Example 1, except that the above-prepared support was used. However, the support (carrier film) could not be transported (i.e., rolled up and unwound) under the conditions in this Comparative Example 6, and a ceramic green sheet could not be prepared.

Tables 1 and 2 show the maximum projection height of the both surfaces of the support, short-circuit rate, type of the releasing layer, coefficient of friction of the top surface of the support, evaluation of transporting property of the support, surface free energy of the support, and evaluation of releasing property of the support in Examples 1 to 4 and Comparative Examples 1 to 6.

The maximum projection height in the both sides (both surfaces) of the support shown in Table 1 were measured with a surface profiling instrument of optical interferometric system (in-plane resolution: 1 μm, height resolution: 0.1 μm).

TABLE 1

| | Maximum Projection Height in Both Surfaces of Support | Shorting Rate (Sheet Thickness) | Type of Releasing Layer |
|---|---|---|---|
| Example 1 | 0.9 μm | 0.7% (3 μm) | non-silicone |
| Example 2 | 0.9 μm | 1.1% (2 μm) | non-silicone |
| Example 3 | 0.3 μm | 3.6% (0.3 μm) | non-silicone |
| Example 4 | 0.9 μm | 0.8% (3 μm) | silicone |
| Com. Ex. 1 | 2.2 μm | 51% (3 μm) | non-silicone |
| Com. Ex. 2 | 2.2 μm | 76% (2 μm) | non-silicone |
| Com. Ex. 3 | 1.3 μm | 16% (3 μm) | non-silicone |
| Com. Ex. 4 | 1.3 μm | 28% (2 μm) | non-silicone |
| Com. Ex. 5 | 0.9 μm | 1.0% (3 μm) | none |
| Com. Ex. 6 | 0.9 μm | — | silicone |

TABLE 2

| | Friction Coefficient in Surface of Support | Support Transporting Property | Surface Free Energy | Releasing Property |
|---|---|---|---|---|
| Example 1 | static friction: 0.20 kinetic friction: 0.25 | good | 27 mJ/m$^2$ | excellent |
| Example 2 | static friction: 0.20 kinetic friction: 0.25 | good | 27 mJ/m$^2$ | excellent |
| Example 3 | static friction: 0.20 kinetic friction: 0.25 | good | 27 mJ/m$^2$ | excellent |
| Example 4 | static friction: 0.32 kinetic friction: 0.37 | good | 28 mJ/m$^2$ | excellent |
| Com. Ex. 1 | static friction: 0.16 kinetic friction: 0.20 | good | 27 mJ/m$^2$ | excellent |
| Com. Ex. 2 | static friction: 0.16 kinetic friction: 0.20 | good | 27 mJ/m$^2$ | excellent |
| Com. Ex. 3 | static friction: 0.18 kinetic friction: 0.22 | good | 27 mJ/m$^2$ | excellent |
| Com. Ex. 4 | static friction: 0.18 kinetic friction: 0.22 | good | 27 mJ/m$^2$ | excellent |
| Com. Ex. 5 | static friction: 0.31 kinetic friction: 0.37 | good | 55 mJ/m$^2$ | good |
| Com. Ex. 6 | static friction: 0.64 kinetic friction: 0.56 | poor | 16 mJ/m$^2$ | — |

While the present invention has been described with reference to what are presently considered to be the preferred embodiments, it is to be understood that the invention is not limited to the disclosed embodiments and examples. On the contrary, the invention is intended to cover various modifications and equivalent arrangements in, for example, the types of ceramic powders, dispersing agents, binders, plasticizers, antistatic agents, solvents, preparation methods (dispersing methods) of the ceramic slurry, specific structures and compositional materials of the support included within the spirit and scope of the appended claims. The scope of the following claims is to be accorded the broadest interpretation so as to encompass all such modifications and equivalent structures and functions.

What is claimed is:

1. A method for manufacturing a ceramic green sheet for multilayer ceramic electronic parts by applying a ceramic slurry onto a support, the method comprising:

providing a support having top and bottom surfaces and having a releasing layer on its top surface and having a smoothness such that at least a region of the top surface of the support to be coated with a ceramic slurry has substantially no projections having a height of equal to or more than about 1 $\mu$m; and applying a ceramic slurry comprising a ceramic powder dispersed in a medium to the releasing layer of the support.

2. The method according to claim 1, wherein the support has a smoothness such that at least a region of the bottom surface of the support has substantially no projections having a height of equal to or more than about 1 $\mu$m, and wherein said region of the bottom surface corresponds to the region of the top surface to be coated with the ceramic slurry.

3. The method according to claim 2, wherein the ceramic slurry is applied such that the resulting ceramic green sheet has a thickness of from about 0.3 to 3 $\mu$m.

4. The method according to claim 3, wherein the top surface of the support to be coated with the ceramic slurry has a coefficient of static friction and a coefficient of kinetic friction both of which are less than or equal to about 0.45.

5. The method according to claim 4, further comprising making said support.

6. A method for manufacturing multilayer ceramic electronic parts, the method comprising:

forming a plurality of ceramic green sheets by the method as claimed in claim 5;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the resulting sintered compact.

7. A method for manufacturing multilayer ceramic electronic parts, the method comprising:

forming a plurality of ceramic green sheets by the method as claimed in claim 4;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the resulting sintered compact.

8. A method for manufacturing multilayer ceramic electronic parts, the method comprising:

forming a plurality of ceramic green sheets by the method as claimed in claim 2;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the sintered compact.

9. The method according to claim 1, wherein the ceramic slurry is applied such that the resulting ceramic green sheet has a thickness of from about 0.3 to 3 $\mu$m.

10. The method according to claim 9, wherein the top surface of the support to be coated with the ceramic slurry has a coefficient of static friction and a coefficient of kinetic friction both of which are less than or equal to about 0.45.

11. The method according to claim 10, further comprising making said support.

12. A method for manufacturing multilayer ceramic electronic parts, the method comprising:

forming a plurality of ceramic green sheets by the method as claimed in claim 10;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the resulting sintered compact.

13. A method for manufacturing multilayer ceramic electronic parts, the method comprising:

forming a plurality of ceramic green sheets by the method as claimed in claim 9;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the resulting sintered compact.

14. The method according to claim 1, wherein the top surface of the support to be coated with the ceramic slurry has a coefficient of static friction and a coefficient of kinetic friction both of which are less than or equal to about 0.45.

15. The method according to claim 14, further comprising making said support.

16. A method for manufacturing multilayer ceramic electronic parts, the method comprising:

forming a plurality of ceramic green sheets by the method as claimed in claim 15;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the resulting sintered compact.

17. A method for manufacturing multilayer ceramic electronic parts, the method comprising:

forming a plurality of ceramic green sheets by the method as claimed in claim 14;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the resulting sintered compact.

18. The method according to claim 1, further comprising making said support.

19. A method for manufacturing multilayer ceramic electronic parts, the method comprising:

forming a plurality of ceramic green sheets by the method as claimed in claim 18;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the resulting sintered compact.

20. A method for manufacturing multilayer ceramic electronic parts, the method comprising:

forming a plurality of ceramic green sheets by the method as claimed in claim 1;

providing a base metal electrode on a surface of each of said ceramic green sheets;

laminating said electrode containing ceramic green sheets together to form a laminate;

firing said laminate to thereby yield a sintered compact; and forming an electrode on an exterior surface of the sintered compact.

* * * * *